United States Patent [19]

Hon

[11] Patent Number: 4,566,713
[45] Date of Patent: Jan. 28, 1986

[54] FOLDING BICYCLE WITH RELEASABLE BRACE ASSEMBLY

[75] Inventor: David T. Hon, Los Angeles, Calif.

[73] Assignee: Hon Folder Development Ltd., Los Angeles, Calif.

[21] Appl. No.: 456,410

[22] Filed: Jan. 7, 1983

[51] Int. Cl.⁴ ............................................... B62B 7/06
[52] U.S. Cl. ................................................. 280/287
[58] Field of Search ....................... 280/278, 287, 274; 403/92, 334

[56] References Cited

U.S. PATENT DOCUMENTS

| | | | |
|---|---|---|---|
| 3,623,749 | 11/1971 | Jensen | 280/278 |
| 3,979,136 | 9/1976 | Lassiere | 280/278 |
| 4,111,447 | 9/1978 | Ishida | 280/278 |
| 4,198,069 | 4/1980 | O'Brian et al. | 280/278 |

*Primary Examiner*—Richard A. Bertsch
*Attorney, Agent, or Firm*—Fulwider, Patton, Rieber, Lee & Utecht

[57] ABSTRACT

A folding bicycle having an elongated handlebar assembly including an elongated post that is hinged at its lower end to swing into a folded position, and a triangular brace assembly having its apex end connected to the upper-end portion of the post at a pivot that lies along the steering axis fo the bicycle, by a quick-connect and quick-release coupling permitting quick and easy folding and unfolding of the bicycle. The base end of the brace assembly extends transversely of the bicycle for lateral and torsional rigidity, the brace bars being anchored to the frame by two laterally spaced hinges defining a common axis. Each brace bar has a section of adjustable length, and each hinge has a take-up mechanism. Three alternative couplings are disclosed, the first being a longitudinally ribbed, transversely tapered wedge-fit coupling, and the second comprising two separable bearing balls that are engageable in a bearing ring at the upper end of the brace assembly, under the control of a lever-operated cam mechanism. The third is a pivot pin that is spring-loaded into coupling engagement with the bearing ring on the base assembly, and is manually retractable to release the ring for folding of the brace assembly.

19 Claims, 9 Drawing Figures

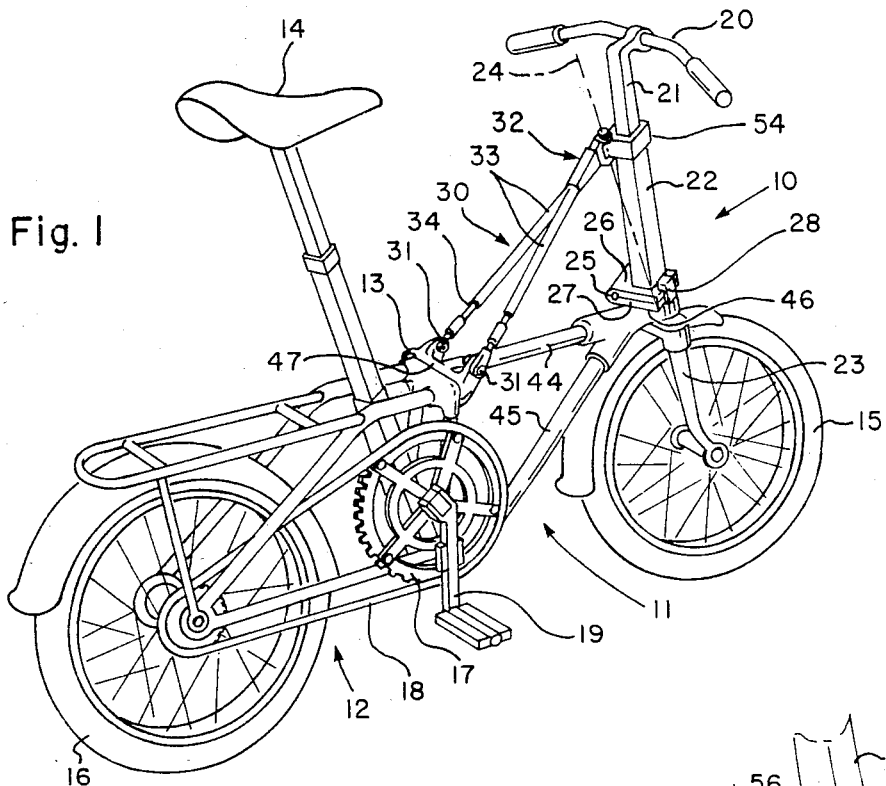
Fig. 1
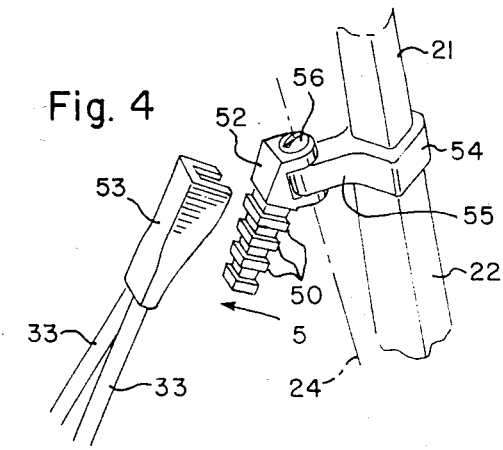
Fig. 2
Fig. 4
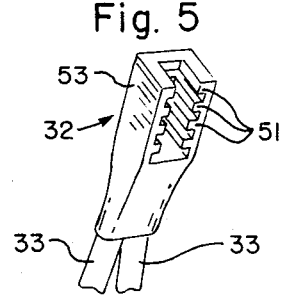
Fig. 3
Fig. 5

FOLDING BICYCLE WITH RELEASABLE BRACE ASSEMBLY

BACKGROUND OF THE INVENTION

This invention relates to folding bicycles, and more particularly to a folding bicycle having elongated supporting members which carry substantial loads during operation of the bicycle.

A bicycle of this general type is shown in the copending application of David T. Hon, Ser. No. 233,624, filed Feb. 12, 1981, now U.S. Pat. No. 4,433,852, issued Feb. 28, 1984 with a relatively low folding frame and a folding handlebar assembly with an elongated steering post carrying a handlebar at its upper end and having a hinge and latch at its lower end. The post is swingable between a lowered position alongside the front wheel and a raised, operating position in which the post is latched when the bicycle is to be ridden.

In bicycles of this type, lightness in weight is important for ease of carrying the bicycle in the folded condition, so structural members should be made as light as possible. On the other hand, all load-bearing members must be capable of supporting the loads to which they will be subjected in use, without objectionable flexing, bending or, of course, breaking.

The handlebar assembly is of particular concern, because of the forces to which it is subjected during pedaling, turning and stopping. Where elongated handlebar assemblies are used, as with low frames making possible very compact folding, it is necessary either to make the assembly very strong, and consequently relatively heavy, or to brace it against operational forces, so that a lighter assembly may be used.

One example of bracing in a prior foldable bicycle is shown in Lassiere U.S. Pat. No. 3,979,136, with a foldable stay, either single or a rectangular frame, that is hinged between its ends to fold in two as the braced member is folded. Another type of bracing approach is shown in Jensen U.S. Pat. No. 3,623,749, with a relatively heavy, generally rectangular bracing frame that telescopes, extending and contracting as the braced member is folded.

The primary objective of the present invention is to provide an improved lightweight brace assembly for use in a folding bicycle of the general type shown in the Hon application, and particularly for bracing the handlebar assembly, which very effectively braces the handlebar, both longitudinaly and laterally, and permits quick and easy folding of both the brace and the handlebar assembly into a compact form.

SUMMARY OF THE INVENTION

The present invention resides in a triangular brace assembly with an apex end positioned behind the upper end portion of the assembly and a relatively broad base end anchored to the frame on laterally spaced hinges defining a folding axis and providing firm support against lateral as well as longitudinal yielding. The apex end is releasably coupled to the upper end portion by a coupling which defines a pivot that lies along the steering axis of the handlebar assembly, to avoid interference with steering of the bicycle, and also includes a manually operable quick-connect and quick-release coupler for connecting the brace assembly to the handlebar assembly.

The preferred brace assembly uses two lightweight brace bars, preferably of fiberglass construction, with upper ends held in side-by-side relation by the coupler and with lower ends held in spaced relation by the hinges. Each illustrative bar has an adjustable-length section between its ends, for precisely maintaining the proper length of the brace, and has tapered connectors at the hinges for taking up any looseness that may develop in use, from wear or other causes.

Various upper couplers are possible, one embodiment using two simple coupling lugs having interfitting longitudinally spaced coupling abutments for longitudinal rigidity, and being transversely tapered for transverse wedged coupling and uncoupling movement. A presently preferred coupler comprises a bracket on the post forming a rotary seat receiving a bearing element on the upper end of the brace assembly, with a releasable pivot in the seat formed by two ball bearings normally clamped against opposite sides of the bearing element, one being movable by a lever-operated cam-and-follower mechanism. Another embodiment has a releasable pivot pin that is spring-loaded into the seat and into a hole in the bearing element, the pin having a knob on one end for pulling of the pin out of the seat to release the brace assembly for folding and to permit re-insertion of the bearing element into the seat as the bicycle is unfolded.

Other features and advantages of the invention, including detailed aspects of the above-mentioned features, will become apparent from the following detailed description, taken in conjunction with the accompanying drawings.

BRIEF DESCRIPTION OF THE DRAWINGS

FIG. 1 is a perspective view of a folding bicycle incorporating a brace assembly in accordance with the present invention;

FIG. 2 is an enlarged fragmentary perspective view of part of FIG. 1, showing the rear lower end portion of the brace assembly and the adjacent parts of the frame;

FIG. 3 is an enlarged fragmentary cross-sectional view taken substantially along line 3—3 of FIG. 2;

FIG. 4 is an enlarged fragmentary perspective view of part of FIG. 1 with parts in moved positions, showing the forward upper end portion of the brace assembly and the adjacent part of the handlebar assembly, with the coupler uncoupled;

FIG. 5 is an enlarged fragmentary perspective view taken generally in the direction of arrow 5 in FIG. 4;

DETAILED DESCRIPTION

Figure 9:
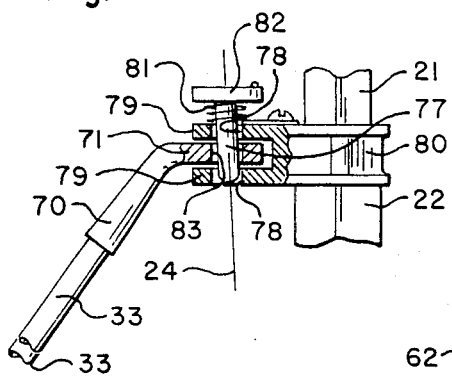
FIG. 9 is a fragmentary side elevational view with parts broken away and shown in cross-section, generally similar to FIG. 7 on a reduced scale, showing another alternative embodiment of the coupler, in coupled condition.

As shown in the drawings for purposes of illustration, the invention is incorporated in a folding bicycle, indicated generally by the reference number 10, of the type that is shown in the aforesaid Hon application. This bicycle has a folding frame formed by front and rear frame sections 11 and 12 that are joined together by a hinge 13, a seat 14 on an elongated support, front and rear wheels 15 and 16 on the frame, and a sprocket 17 coupled by a chain 18 to the rear wheel and driven by a pedal 19 on each side of the frame.

The bicycle is steered by a folding handlebar assembly including a handlebar 20 carried on an extension section 21 of a steering post 22 which is coupled to the front wheel by a fork 23 that is rotatably supported in a bearing (not shown) mounted in a fitting 46 on the front end of the front frame section 12. This bearing defines a steering axis 24 (FIG. 1), about which the front wheel turns during steering. It can be seen in FIG. 1 that the post 22 is offset from this axis, forwardly in this instance, for reasons having to do primarily with compactness of folding.

Folding of the handlebar assembly occurs at a hinge immediately above the bearing in the front frame section, formed by a hinge pin 25 connecting a movable hinge leaf 26 on the lower end of the post 22 to a fixed leaf 27 on the frame. The post of the illustrative bicycle folds in a generally counterclockwise direction, as viewed in FIG. 1, into a depending position alongside the front wheel 15, while turning the handlebar 20 into a front-to-rear attitude, as a result of a compound hinge angle.

To hold the post 22 upright with the handlebar in the raised, operating position shown in FIG. 1, a latch 28 is provided on the side of the post opposite the hinge pin 25. This latch holds the movable upper leaf of the hinge securely but releasably against the fixed lower leaf.

In accordance with the present invention, a longitudinally rigid triangular brace assembly, indicated generally by the reference number 30, is positioned between the bicycle frame and the upper portion of the handlebar post 22, and has a relatively broad base end that extends transversely of the frame and is anchored thereto by laterally spaced hinges 31, and an apex end that is pivotally connected to the handlebar post along the steering axis 24 of the handlebar assembly by a quick-connect and quick-release coupler 32. The brace assembly securely braces the handlebar assembly against longitudinal, lateral and torsional loading, while avoiding interference with free steering, and is quickly and easily disconnected for folding, and reconnected for normal operation during unfolding.

More specifically the brace assembly 30 comprises two elongated brace bars 33 that have upper ends held in side-by-side relation by the upper coupler 32 at the apex end, and lower ends that are secured to the hinges 31 at the base end.

The brace bars 33, which preferably have bodies 33a made of fiberglass for high strength and lightness of weight, are made precisely adjustable in length for proper bracing of the handlebar post 22. For this purpose, each bar has, between its ends, an adjustable-length section, herein constituting the lower end portions of the bars and each comprising a threaded stud 34 extending beyond the end of the fiberglass body, a sleeve 35 threaded onto the stud and a second stud 36 having a reversely threaded connection with the sleeve so that turning of the sleeve in one direction lengthens the arm 33 and turning in the opposite direction shortens the arm.

As shown most clearly in FIG. 3, the studs 36 forming the lower ends of the arms are threaded into two connectors 37 which are pivotally joined to two bolts 38 to form the hinges 31 for the brace assembly. These bolts have tapered heads 39 that are seated in correspondingly tapered holes 40 in the connectors, and extend through holes 41 in two laterally spaced upstanding mounts 42 on the rear end of the front frame section. Nuts 43 are threaded onto the bolts to draw the tapered heads 39 snugly into the tapered holes 40 and take up all looseness in the hinges, while permitting folding of the brace during folding of the bicycle.

In this instance, the front frame section 11 is formed by a "top tube" 44 and a "down tube" 45, both joined together by the front fitting 46 carrying the steering bearing, and a rear fitting 47 is mounted on the opposite end of the top tube to form the rear upper end of the front frame section. This fitting is generally U-shaped, having the mounts 42 at its opposite ends and the hinge 13 at one end. A similar, coaxial hinge preferably is formed at the lower end of the down tube 45, along with a suitable latch (not shown) for latching the two frame sections releasably together.

The upper coupler 32 shown in FIGS. 1 through 5 is a simple "press-together" coupler having interfitting longitudinally spaced coupling abutments 50 and 51 for longitudinal rigidity, and transverse, wedging tapers on the coupling elements to permit coupling and uncoupling of the coupler by simple transverse movement. This forms a relatively simple and inexpensive coupler that is capable of rapid manual engagement and disengagement.

As shown most clearly in FIGS. 4 and 5, the coupler 32 comprises two interfitting coupling lugs 52 and 53, one mounted on the post and one mounted on the upper ends of the brace bars 33. The lug 52 herein has a series of four angular ribs that are separated by four angular grooves to form the abutments 50, and the lug 53 has a recess in one side containing four angular ribs forming the abutments 51 and four angular grooves for receiving the abutments 50. These ribs and grooves interfit and interlock snugly, the parts having complementary shapes and tapers that insure a snug press fit, even if some wear occurs in use over a long period of time.

To mount the upper lug 52 on the handlebar post 22, a collar 54 is fastened to the upper end of the post with a bracket 55 on the collar projecting rearwardly from the post with a pin 56 pivoting the lug 22 on this bracket along the steering axis 24. This pin is a screw that extends through aligned holes in the bracket and a bifurcated end of the lug 52, and is threadedly secured in place. The grooved portion of the lug is disposed at a downward incline, so that it lies along a line from the bracket to the hinges 31.

With this arrangement, the coupler 32 can be coupled simply by placing the lug 53 over the lug 52, aligning the respective ribs and grooves, and pressing the two lugs together. The tapers result in friction locking of the posts in a transverse direction, and the ribs and grooves result in positive mechanical locking in a longitudinal direction. Uncoupling is accomplished simply by pushing the outer lug 53 off the inner lug 52.

Figure 6:
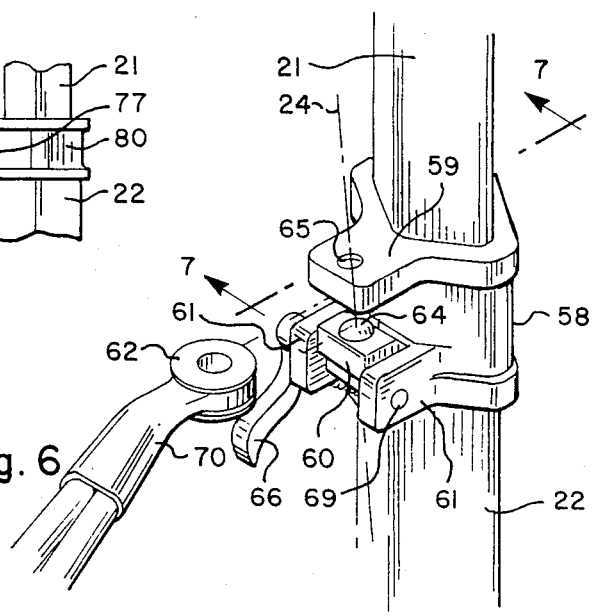
FIG. 6 is an enlarged fragmentary perspective view generally similar to FIG. 4 and showing an alternative embodiment of the coupler, in uncoupled condition.
Figure 8:
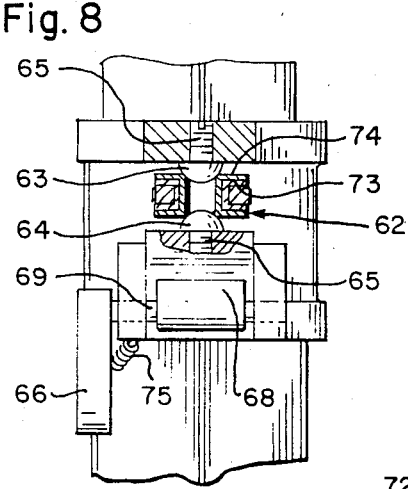
FIG. 8 is a fragmentary cross-sectional view taken substantially along line 8—8 of FIG. 7; and element, the pin having a knob on one end for pulling of the pin out of the seat to release the brace assembly for folding and to permit re-insertion of the bearing element into the seat as the bicycle is unfolded.
Figure 7:
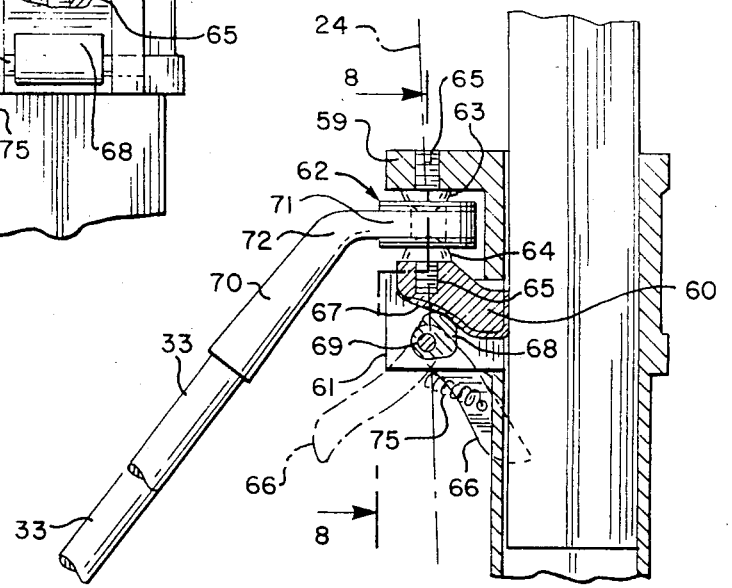
FIG. 7 is a slightly enlarged fragmentary cross-sectional view taken substantially along line 7—7 of FIG. 6, with the parts moved to the coupled condition and with some of the parts shown in side elevation.

Shown in FIGS. 6, 7 and 8 is an alternative embodiment that presently is the preferred embodiment, for ease and reliability of coupling and uncoupling. In this embodiment, a collar 58 is mounted on the post 52 with a rearwardly projecting bracket formed by an upper tab 59 and a lower tab 60 movably mounted between two spaced lugs 61. These tabs define a seat between them for receiving a rotary bearing element 62 at the apex of the brace assembly, and have movable pivot means for rengaging the bearing element and retaining it rotatably in the seat.

The preferred pivot means comprises ball bearings 63 and 64 mounted on the upper and lower tabs 59 and 60 in generally vertically spaced relation along the steering axis 24, each herein being a half-ball on a threaded stud 65 that secures the ball to its supporting part, and each centered on the steering axis 24. The lower tab 60 is movable between the lugs 61, toward and away from the upper tab 59, and its position is controlled by a cam-and-follower mechanism including a manually operable lever 66 for latching the bearing element 62 rotatably in the seat.

As shown in FIGS. 6 and 7, the tab 60 is slidably mounted between the two lugs 61 and has a contoured lower side 67 that bears against a rotating cam 68 that is mounted on a shaft 69 rotatably mounted in the lugs 61. The lever 66 is fast on one end of the shaft to turn the latter and the cam. As can be seen in FIG. 7, the cam 68 has an offset side, or lobe, that engages the contoured underside of the lower tab 60, or follower, and when swung upwardly, presses the follower upwardly to raise the lower ball bearing 64 toward the upper one.

The bearing element 62 is mounted on the upper ends of the brace bars 33 by a fitting 70 having an upwardly inclined sleeve that is clamped around the brace bars and a ring 71 that is joined to the sleeve by a bend 72 that disposes the ring in a horizontal attitude when it is in the seat. The bearing element 62 is mounted in the ring, and has an inner annular layer 73 overlying the ring 71, covered by an outer annular layer 74 of suitable antifriction material.

When the lower ball bearing 64 is in its lowered position, the bearing element 62 can be fitted freely into the seat between the tabs 59 and 60. For this purpose, the lever 66 is positioned in its released position, shown in FIG. 6 and in broken lines in FIG. 7, with the cam lobe disengaged by rotation clockwise from the position shown in FIG. 7. A spring 75 urges the lever to this position. Thus, the lower lug 60 can drop away from the upper lug, to admit the bearing element into the seat.

After the bearing element 62 has been positioned in the seat, the lever 66 is pushed in, to the position shown in full lines in FIG. 7, swinging the cam to the raised position shown in full lines, and thereby pressing the follower lug 60 upwardly to clamp the bearing element between the two ball bearings 63 and 64. These provide a self-centering action in the openings formed by the opposite ends of the passage through the bearing element, as shown in FIGS. 7 and 8. The contours of the cam and follower elements 67 and 68 are such that the parts are retained securely in the engaged position by the nested face-to-face engagement of the cam and the follower, until positively disengaged by movement of the lever 66 toward the release position. This can be assisted by making the spring 75 an overcenter spring.

This embodiment provides quick, easy and secure connection of the apex end of the brace assembly 30 to the post 22, and maintains precise alignment of the pivot-defining ball bearings 63 and 64 with the steering axis 24. It also provides quick and easy releasing of the brace assembly during folding of the bicycle, by simply flipping up the lever 66 and pulling the bearing element 62 from the seat.

FIG. 9 shows another alternative embodiment of the coupler in which the pivot-defining means is a pin 77 that is slidably mounted in two aligned holes 78 that are spaced apart along the steering axis 24, in two parallel lugs 79 projecting rearwardly from a collar 80 on the upper end of the post 22. The pin is yieldably urged downwardly across the seat and into the lower hole 78, by a coiled extension spring 81, that acts between the upper lug and a knob 82 on the upper end of the pin.

The bearing element in this instance is simply the ring 71 on the upper end of the fitting 70 that is clamped on the upper ends of the brace bars 33. An antifriction liner could be provided for the bearing hole 83 in the ring, but it is not essential to do so.

With this arrangement, the pin 77 normally extends through the two lugs 79 and the ring 71 forming the bearing element, connecting the brace assembly 30 to the post 22 along the steering axis 24. To disconnect the brace assembly for folding, the pin is pulled up, out of the ring 71, using the knob 82 as a manually operable release element, and the ring is pulled from between the lugs 79. As in each embodiment, the brace assembly then is simply lowered to its folded position, herein along the top tube 44 and over the fixed leaf 27 of the hinge for the handlebar assembly.

From the foregoing, it should be apparent that the combination constituting the present invention very effectively braces the elongated handlebar assembly against all of the forces to which it is subject in operation, and thereby materially enhances the performance of the bicycle. In addition, this is accomplished with a very lightweight brace assembly, and with effective and convenient-to-operate couplers. It has been found that the brace is so effective that the latch 28, formerly designed to be very heavy and secure, can be made very light and simple. It also has been found to be advantageous to mount the bracing assembly in line with the central connecting elements of the two frame sections 11 and 12, and adjacent the sprocket assembly, since this area is the backbone of the bicycle and provides very secure support.

It also will be evident that, while several embodiments have been illustrated and described, various modifications and changes may be made without departing from the spirit and scope of the invention.

We claim as our invention:

1. In a folding bicycle having a front frame section with front and rear ends, and an elongated folding handlebar assembly rotatably mounted on said frame section to turn about a predetermined steering axis, and including an elongated steering post normally extending upwardly from said front end in an upright steering position and having a lower end that is pivotally connected to said front end for tilting of the post downward to a folded position, an improved brace assembly, comprising:

first and second elongated, longitudinally rigid brace bars having front upper ends that are disposed in side-by-side relation behind the upper end of said post, said brace bars being inclined downwardly and rearwardly toward the rear end of said frame section and diverging laterally to rear lower ends that are spaced apart transversely of said frame section;

a first coupler for releasably joining the upper ends of said brace bars to said post along said steering axis, said coupler comprising a first coupling element secured to said post and defining an axis for the coupler that lies on said steering axis, a second coupling element secured to the upper ends of said brace bars, and manually operable quick-connect and quick-release coupling means for connecting and disconnecting said first and second coupling elements;

and second couplers pivotally connected to said rear end of said frame section in laterally spaced relation to swing about a common transverse folding axis, said second couplers being secured to the rear lower ends of said brace bars to provide a secure base therefor on said frame section against both transverse and longitudinal yielding and to permit downward folding of the brace bars when said first coupler is released.

2. The combination as defined in claim 1 wherein each of said brace bars includes an adjustable section between its ends for precisely adjusting the overall length of the bar.

3. The combination as defined in claim 1 wherein:

said first coupling element comprises a bracket on said post, a first lug having a first series of coupling abutments that are spaced apart longitudinally of said brace bars; and a pivot joining said lug to said bracket to turn about said axis, and said second coupling element comprises a second lug having a second series of longitudinally spaced coupling abutments for interfitting and releasably interlocking with said first series of coupling abutments.

4. The combination as defined in claim 3 wherein said first lug has external coupling abutments formed by alternating ribs and grooves, and said second lug has internal coupling abutments formed by alternating grooves and ribs, the abutments of said series being of complementary size and shape and being tapered transversely of the brace arms for a transversely releasable wedged fit.

5. The combination as defined in claim 1 wherein:

said first coupling element comprises a bracket on said post forming a seat for receiving said second coupling element, and having movable pivot means in said seat defining said turning axis, and pivot means being movable between engaged and disengaged positions by said quick-connect and quick-release coupling means, and said second coupling element comprises a rotary bearing element on the upper ends of said brace bars for insertion in and removal from said seat, and for rotary engagement with and disengagement from said pivot means.

6. The combination as defined in claim 5 wherein said pivot means comprise ball bearings spaced apart along said turning axis on opposite sides of said seat and movable away from and toward each other by said coupling means.

7. The combination as defined in claim 6 wherein said coupling means comprise:

an operating lever pivoted on said bracket for swinging between engaged and released positions, a cam rotated by said lever, and a follower engaged by said cam and movable thereby longitudinally of said turning axis, one of said ball bearings being fixed on said bracket, and the other being carried by said follower and moved thereby toward the other ball bearing as said lever moves toward the engaged position, to clamp said ball bearings against said rotary bearing element.

8. The combination as defined in claim 7 wherein said rotary bearing element comprises a bearing ring having openings in its opposite sides for receiving said ball bearings.

9. The combination as defined in claim 5 wherein said pivot means comprise a pin mounted on said bracket to extend into said seat from one side thereof; and said coupling means comprise a spring yieldably urging said pin into said seat, and a manual operator for pulling said pin out of said seat for insertion of said second coupling element therein.

10. The combination as defined in claim 9 wherein said second coupling element is a bearing having a hole therein for rotatably receiving said pin.

11. In a folding bicycle having a frame with front and rear end portions, and an elongated folding handlebar assembly rotatably mounted on the front end portions of said frame to turn about a predetermined steering axis and normally extending upwardly from said front end portions in an upright steering position, and having a lower end that is connected to said frame for swinging of the handlebar assembly downward into a folded position, an improved brace assembly, comprising:

an elongated generally triangular brace having a relatively narrow apex end positioned adjacent the upper portion of said handlebar assembly, said brace being inclined downwardly and rearwardly to a rear portion of said frame spaced rearwardly from said handlebar assembly and having a relatively broad base end positioned adjacent said rear portion;

first connecting means for pivotally coupling said apex end to said handlebar assembly along said axis to brace the latter in said upright steering position while permitting turning of the handlebar assembly;

second connecting means for coupling said base end to said rear portion of said frame with said base extending transversely across said frame, whereby said brace provides both transverse and longitudinal bracing of said handlebar assembly;

one of said connecting means including a manually operable quick-connect and quick-release coupler for connecting and disconnecting the associated end of said brace, and the other of said connecting means including a hinge for swinging of said brace between the inclined bracing position and a folded position.

12. The combination defined in claim 11 wherein said brace comprises two elongated, longitudinally rigid brace bars having upper ends that are disposed in side-by-side relation behind said handlebar assembly, and lower ends that are laterally spaced apart, transversely of said frame, and secured to said frame by said second coupling means.

13. The combination defined in claim 11 wherein said first connecting means is the disconnectable connecting means and said second connecting means includes the hinge, whereby said apex end folds downwardly toward said frame when released.

14. The combination defined in claim 13 wherein said first connecting means comprise a first abutment member pivotally connected to said handlebar assembly, and a second abutment member secured to said apex end, said abutment members having interfitting and interlocking sets of longitudinally spaced abutments thereon and being transversely tapered for transverse wedging engagement and disengagement.

15. The combination defined in claim 13 wherein said first connecting means comprise means defining a rotary seat behind said handlebar assembly with selectively engageable and disengageable pivot means in said seat, and a bearing element on said brace insertible in and removable from said seat.

16. The combination defined in claim 15 wherein said pivot means comprise two ball bearings spaced apart along said turning axis, and said quick-connect and quick-release coupler comprises a lever-operated mechanism for moving one of said ball bearings toward and away from the other, said bearing element having bearing openings in its opposite sides for engaging said ball bearings.

17. The combination defined in claim 15 wherein said pivot means comprises a pin extending into said seat from one side thereof, and mounted for movement out of said seat for insertion of said bearing element, said pin being urged yieldably into the seat and having means thereon for shifting the pin out of the seat for insertion of the bearing element, and said bearing element having a bearing hole for rotatably receiving said pin.

18. In a folding bicycle having a frame, and an elongated folding member extending upwardly from said frame in an upright operating position and having a lower end that is connected to said frame for folding of the member downward into a folded position;
an improved brace assembly, comprising:
an elongated, generally triangular and longitudinally rigid brace having a relatively narrow apex end positioned adjacent the upper end portion of said member, and being inclined downwardly away from said member to a portion of said frame spaced from said member, said brace having a relatively broad base;
first quick-connect and quick release coupling means releasably connecting said apex end to said member;
and two laterally spaced hinges spaced apart transversely of said frame and connecting said base to said frame, said hinges forming a secure anchor to brace said member both laterally and longitudinally, and permitting downward folding of said brace when said coupling means is released.

19. In a folding bicycle having a front frame section with front and rear ends, and an elongated folding handlebar assembly rotatably mounted on said frame section to turn about a predetermined steering axis, and including an elongated steering post normally extending upwardly from said front end in an upright steering position and having a lower end that is pivotally connected to said front end for tilting of the post downward to a folded position, an improved brace assembly, comprising:
first and second elongated, longitudinally rigid brace bars having front upper ends that are disposed in side-by-side relation behind the upper end of said post, said brace bars being inclined downwardly and rearwardly toward the rear end of said frame section and diverging laterally to rear lower ends that are spaced apart transversely of said frame section;
a first coupler for releasably joining the upper ends of said brace bars to said post along said steering axis, said coupler comprising a first coupling element secured to said post and defining an axis for the coupler that lies on said steering axis, a second coupling element secured to the upper ends of said brace bars, and manually operable quick-connect and quick-release coupling means for connecting and disconnecting said first and second coupling elements;
and second couplers pivotally connected to said rear end of said frame section in laterally spaced relation to swing about a common transverse folding axis, said second couplers being secured to the rear lower ends of said brace bars to provide a secure base therefor on said frame section against both transverse and longitudinal yielding and to permit downward folding of the brace bars when said first coupler is released;
said second couplers comprising laterally spaced mounts on said frame section, connecting lugs on said brace arms disposed beside said mounts and having tapered holes, and pivot pins in the form of bolts having tapered heads in said holes, with nuts for drawing said heads snugly into said holes.

* * * * *